United States Patent [19]

Shimaoka et al.

[11] Patent Number: 4,647,996
[45] Date of Patent: Mar. 3, 1987

[54] RECORDING AND REPRODUCING APPARATUS HAVING SLIDING LOADING AND UNLOADING MECHANISM

[75] Inventors: Motohiro Shimaoka; Yukio Saito, both of Furukawa, Japan

[73] Assignee: Alps Electric Co., Ltd., Japan

[21] Appl. No.: 567,260

[22] Filed: Dec. 30, 1983

[30] Foreign Application Priority Data

Dec. 29, 1982 [JP] Japan ............................ 57-201833[U]

[51] Int. Cl.⁴ .............................................. G11B 5/012
[52] U.S. Cl. ..................................................... 360/97
[58] Field of Search ..................................... 360/97–99, 360/71, 96.5–96.6, 137, 93, 86; 369/270–271

[56] References Cited

U.S. PATENT DOCUMENTS

| | | | |
|---|---|---|---|
| 3,936,011 | 2/1976 | Staar | 360/96.5 X |
| 4,101,946 | 7/1978 | Takamatsu | 360/105 |
| 4,291,353 | 9/1981 | Fletcher et al. | 360/99 X |
| 4,510,540 | 4/1985 | Kato | 360/93 |

Primary Examiner—John H. Wolff
Assistant Examiner—David J. Severin
Attorney, Agent, or Firm—Guy W. Shoup

[57] ABSTRACT

A recording and reproducing apparatus comprises a cartridge holder accommodating therein a disk cartridge, a body housing therein the cartridge holder and having a side wall, and a cam slidable on the side wall for moving the cartridge holder from a loaded position back to a position prior to loading, the cam being disposed between the side wall and a side of the cartridge holder and having on a side thereof a plurality of projections held in contact with the side wall.

2 Claims, 4 Drawing Figures

RECORDING AND REPRODUCING APPARATUS HAVING SLIDING LOADING AND UNLOADING MECHANISM

BACKGROUND OF THE INVENTION

The present invention relates to a recording and reproducing apparatus employing disk cartridges as information storage mediums.

There have in the recent past been developed recording and reproducing apparatus for effecting recording and reproducing operation by inserting in a cartridge holder thereof a disk cartridge of a hard material housing a magnetic disk rotatably therein. The cartridge holder can be displaced from a loaded postion to a position prior to loading by a cam on an eject button. The prior apparatus is disadvantageous in that when the cam wobbles or otherwise is operated unstably, the cartridge holder cannot be moved back properly.

SUMMARY OF THE INVENTION

It is an object of the present invention to provide a recording and a reproducing apparatus which will eliminate the foregoing prior drawback and has means for actuating a cam stably and reliably to enable a disk cartridge to be moved back properly to a position prior to loading.

According to the present invention, there is provided a recording and reproducing apparatus comprising a cartridge holder accommodating therein a disk cartridge, a body housing therein the cartridge holder and having a side wall, and a cam slidable on the side wall for moving the cartridge holder from a loaded position back to a position prior to loading, the cam being disposed between the side wall and a side of the cartridge holder and having on a side thereof a plurality of projections held in contact with the side wall.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
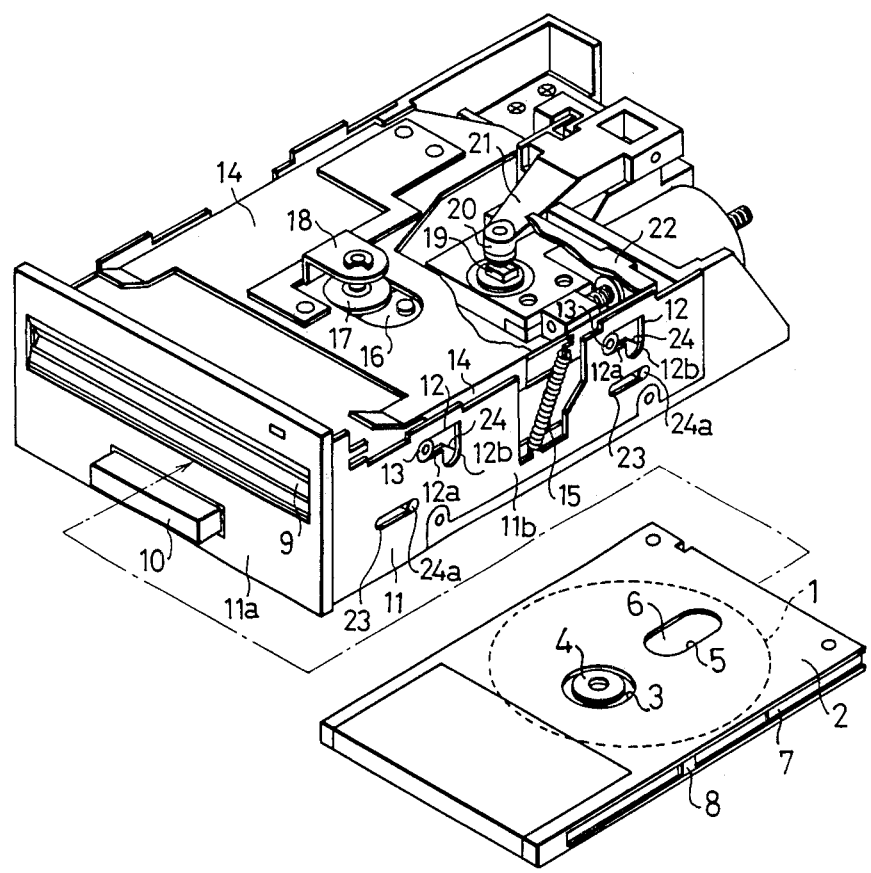
FIG. 1 is a perspective view of a recording and reproducing apparatus of the present invention, together with a disk cartridge for use therein.

As shown in FIG. 1, a magnetic disk 1 is rotatably housed in a disk cartridge 2 made of hard synthetic resin and has a central hub 4 projecting through a central hole 3 in the disk cartridge 2. The disk cartridge 2 has a magnetic head insertion slot 5 defined therein and a shutter 6 of metal disposed below the magnetic head insertion slot 5. The disk cartridge 2 has grooves 7 defined in side edges thereof, there being a shutter actuator 8 slidably disposed in one of the grooves 7 for actuating the shutter 6.

Figure 2:
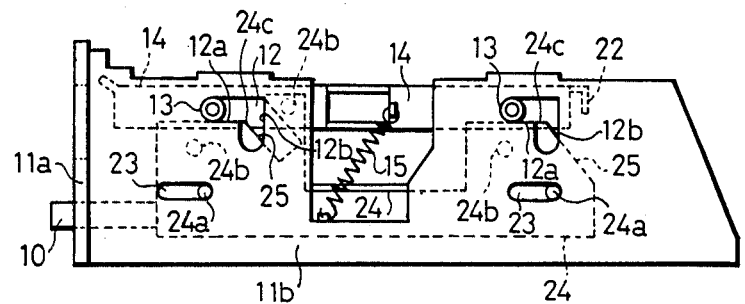
FIG. 2 is a side elevational view of the recording and reproducing apparatus of FIG. 1, showing an unloaded position.
Figure 3:
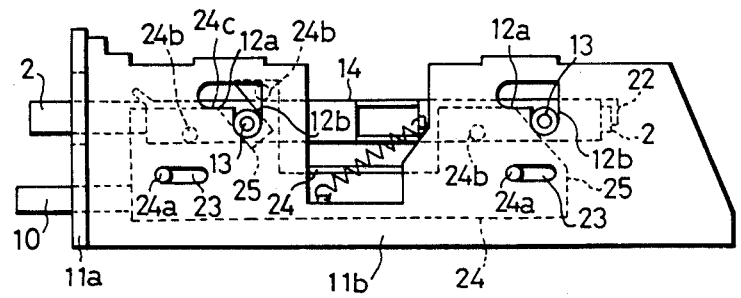
FIG. 3 is a view similar to FIG. 2, showing a loaded position.
Figure 4:
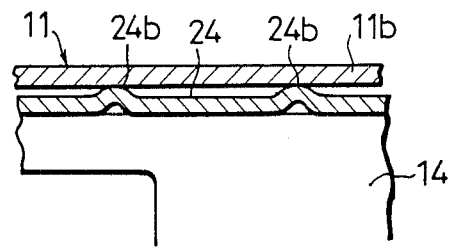
FIG. 4 is an enlarged fragmentary cross-sectional view of projections.

A recording and reproducing apparatus includes a body 11 having a cartridge insertion hole 9 and an eject button 10 in a front frame member 11a. A cartridge holder 14 is disposed in the body 11 and has rollers 13 mounted on sides thereof and guided respectively in hook-shaped holes 12 defined in respective sides of of the body 11. The cartridge holder 14 is normally urged by a tension spring 15 to move toward the front frame member 15 and in a downward direction in the body 11, the tension spring 15 acting between the cartridge holder 14 and the body 11. When the disk cartridge 2 is not inserted in the body 11, as shown in FIG. 2, the rollers 13 are positioned at front ends of horizontal portions 12a of the hook-shaped holes 12 under the bias of the tension spring 15.

As illustrated in FIG. 1, the cartridge holder 14 has on its front upper portion a support 18 for a holder means 17 for pressing the hub 4 of the magnetic disk 1 toward a turntable 16, and on its rear upper portion an abutment disposed in confronting relation to a magnetic head 19 for lifting an arm 21 with a pad 20 when the rollers 13 on the cartridge holder 14 are located in the horizontal portions 12a of the hook-shaped holes 12. The cartridge holder 14 has a bent portion 22 projecting from a rear end thereof for abutting against a front end of the cartridge 2.

To the eject button 10 is connected a lifting cam 24 disposed between a side wall 11b of the body 11 and the cartridge holder 14 and having on a side thereof a pin 24a guided in a horizontal slot 23 defined in one of the sides of the body 11. The cam 24 is slidable on the side wall 11b of the body 11 and has lifting slant edges 25 engageable with the rollers 13 in vertical portions 12b of the hook-shaped holes 12. The cam 24 also has on the side thereof a plurality of projections 24b held in contact with the side wall 11b of the body.

When the cartridge 2 is inserted into the cartridge holder 14 until the front edge of the cartridge 2 pushes the bent portion 22 of the cartridge holder 14, the latter is moved upwardly. When the centers of the rollers 13 are displaced from flat edges 24c of the cam 24 onto the slant edges 25, the latter are pressed leftward by the rollers 13 under the resiliency of the tension spring 15. At the same time that the rollers 13 are moved to lower ends of the vertical portions 12b of the holes 12, the cartridge holder 14 is depressed into a loaded position. Then, the hub 4 of the magnetic disk 1 is pressed down against the turntable 16 by the presser 17 on the cartridge holder 14, and the magnetic disk 1 is now rendered rotatable.

The magnetic head insertion slot 5 is now open with the shutter 6 actuated by a pin (not shown) disposed adjacent to the cartridge insertion hole 9. Depression of the cartridge holder 14 causes the pad 20 on the arm 21 to move downwardly until the magnetic disk 1 is held against the magnetic head 19. The recording and reproducing apparatus is ready for recording signals on the magnetic disk 1 or reproducing signals therefrom through the magnetic head 19.

When the cartridge holder 14 is to be brought from the loaded position to an unloaded position, the eject button 10 is pushed in to cause the cam 24 to slide smoothly without wobbling motion with its projections 24b in contact with the side wall 11b of the body 11 and to enable the slant edges 25 of the cam 24 to raise the rollers 13 from the lower ends of the vertical portions 12b of the hook-shaped holes 12. The rollers 13 are lifted as they are clamped between the slant edges 25 and the rear edges of the vertical portions 12b of the hook-shaped holes 12. When the rollers 13 reach the horizontal portions 12a, the rollers 13 are disengaged from the slant edges 25. The rollers 13 are now abruptly displaced toward the front ends of the horizontal portions 12a under the force of the tension spring 15. Concurrent with this movement of the rollers 13, the cartridge holder 14 is quickly moved upwardly and toward the cartridge insertion hole 9 into a position prior to loading.

With the foregoing construction, the cam for moving the cartridge holder from a loaded position back to a position prior to loading can be slid stably and reliably without being subjected to lateral wobbling motion through contact between the projections on the cam and the side wall of the body, so that the cartridge holder can be returned properly.

Although a certain preferred embodiment has been shown and described, it should be understood that many changes and modifications may be made therein without departing from the scope of the appended claims.

What is claimed is:

1. A recording and reproducing apparatus having a front opening for insertion of a disk cartridge to be loaded or unloaded to or from an operative position for recording and reproducing in the apparatus, comprising:

a housing having a side wall extending longitudinally from the front opening of the apparatus;

a cartridge holder in said housing for receiving a disk cartridge inserted therein, said cartridge holder being movable to or from the operative position; and a movable cam disposed between said side wall and said cartridge holder having a portion in engagement with said cartridge holder such that said cam is moved longitudinally as said cartridge holder is moved to the operative position;

wherein said movable cam has a plurality of rounded projections unitary with said cam and extending in sliding contact against said side wall for ensuring lateral stability in the sliding movement of the cam with respect to said side wall when said cam is moved longitudinally.

2. A recording and reproducing apparatus according to claim 1, wherein said side wall have hook-shaped holes, said cartridge holder having rollers disposed in said hook-shaped holes, respectively, and slidably movable therein in response to operation of said cam.

* * * * *